(12) United States Patent
Soljanin (10) Patent No.: US 6,188,337 B1
(45) Date of Patent: Feb. 13, 2001

(54) LOW DISPARITY CODING METHOD FOR DIGITAL DATA

(75) Inventor: Emina Soljanin, Chatham, NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/323,490

(22) Filed: Jun. 1, 1999

(51) Int. Cl.[7] .................................................. H03M 7/46
(52) U.S. Cl. ............................................................... 341/59
(58) Field of Search .............................. 341/59, 106, 95, 341/58

(56) References Cited

U.S. PATENT DOCUMENTS 4,486,739    12/1984    Franaszek et al. .
5,663,724 *   9/1997    Westby .................................... 341/59
6,054,944 *   4/2000    Yamashita ............................... 341/95

\* cited by examiner

*Primary Examiner*—Brian Young
(74) *Attorney, Agent, or Firm*—Martin I. Finston

(57) ABSTRACT

A 16B/18B low disparity code is described. The 16-bit input word is split into two bytes, i.e., into two 8-bit words, and each byte is mapped to a 9-bit word. The image of each input byte under the mapping depends at least in part on its disparity, and also in some cases on the disparity of the other word.

Certain of the images under the mapping are then inverted. The decision whether to invert an image depends, at least in part, on the running digital sum (RDS) of the output. The RDS is the sum of all 1's in the data stream from its beginning (or from a designated starting point).

Significantly, all possible input words are grouped, by disparity, into four categories. The rule for mapping of input words is different for each of the four categories.

15 Claims, 9 Drawing Sheets

LOW DISPARITY CODING METHOD FOR DIGITAL DATA

FIELD OF THE INVENTION

This invention relates to methods for encoding digital data. More particularly, this invention relates to serial binary data, and methods for encoding such data in preparation for placing such data on a transmission or storage channel. Still more particularly, this invention relates to methods that adjust the frequency power spectrum of the encoded data.

ART BACKGROUND

Block codes are widely used in optical storage and transmission of data. In accordance with the use of such a code, an input stream of binary bits is partitioned into input words of a fixed length. Each input word is mapped to an encoded output word of a second fixed length that is longer than that of the input words. The encoded output word is referred to as a codeword.

Several advantages may be gained from the use of block transmission codes. These advantages relate generally to error detection and to the quality of the recovered signal. One specific advantage is that the dc component of the encoded signal, i.e., the power spectral content at or near zero frequency, can be suppressed by using an appropriate code. This is desirable in, e.g., optical communication systems because fiber optic receivers often include an ac-coupled input stage. The processing of the recovered signal is simplified, and the quality of that signal is improved, if information content is suppressed at the relatively low frequencies where coupling is inefficient. Another advantage of dc suppression is that it simplifies the problem of recovering clock timing from the signal data.

It should be noted that actual two-level signals may be transmitted as sequences of 1's and 0's, or as sequences of +1's and −1's, or in various other equivalent representations. We will refer to all such signals as binary signals, and for convenience only and without limitation, we will take a sequence of 1's and 0's as exemplary of all such signals.

Various block transmission codes are known to those skilled in the art. For example, the well-known Manchester code maps each input bit into two output bits. Other well-known codes map 5-bit input words to 6-bit codewords. Such codes are referred to as 5B/6B codes. Yet other codes are 8B/10B codes. One example of an 8B/10B code is described in U.S. Pat. No. 4,486,739, issued to P. A. Franaszek et al. on Dec. 4, 1984. In the coding scheme of Franaszek et al., the 8B/10B coder is partitioned into a 5B/6B coder plus a 3B/4B coder.

For the purpose of spectrally adjusting the encoded signal to suppress dc power, it is generally advantageous to employ relatively high redundancy, that is, to employ a relatively high length ratio of the codeword to the input word. One reason for this is that spectral adjustment is achieved, at least in part, when the number of 1's in each codeword is exactly or approximately matched to the number of 0's. The excess of 1's over 0's, or of 0's over 1's, in a codeword is referred to as its disparity. Thus, decreasing the disparity tends to improve the power spectrum. However, of all the words of a given length, only a fraction of them will have zero, or very small, disparity. Thus, a requirement of low disparity reduces the number of available codewords and thus reduces the amount of information that can be transmitted per codeword. To compensate, it may be necessary to increase the redundancy, i.e., to increase the length of the codewords.

On the other hand, increasing the redundancy of the codewords decreases the gross rate at which information can be transmitted over the communication channel. Therefore, there is a tradeoff between redundancy and disparity. Both cannot be minimized simultaneously. There remains a need to find encoding schemes that combine moderate redundancy with moderate disparity.

SUMMARY OF THE INVENTION

I have invented such a coding scheme.

My code is a 16B/18B low disparity code. The 16-bit input word is split into two bytes, i.e., into two 8-bit words, and each byte is mapped to a 9-bit word. The image of each input byte under the mapping depends, at least in part, on its disparity.

In some cases, the resulting image is an intermediate image word, which is then inverted to obtain the output codeword. A word is said to be inverted if each of its 1's is converted to a 0, and each of its 0's is converted to a 1. The decision whether to invert an image depends, at least in part, on the running digital sum (RDS) of the output. The RDS is the sum of all 1's in the data stream from its beginning (or from a designated starting point).

All possible input words are grouped, by disparity, into a plurality of distinct categories. The rule for mapping of input words is different for each of the categories.

DETAILED DESCRIPTION

The only disparities possible for an 8-bit word are 0, ±2, ±4, ±6, and ±8. There are 70 8-bit words having a disparity of 0. Fifty-six words have a disparity of 2, and similarly for −2. For 4 and for −4 there are 28. For 6 and for −6 there are 8, and for 8 and for −8 there is only 1.

Each 16-bit input word is split into two 8-bit input words. Eight-bit input words of disparity 0 are assigned to class A. Words of disparity 2 or 4 are assigned to class B. Class B is further subdivided into class B1, which contains words of disparity 2, and class B0, which contains words of disparity 4. Words of disparity −2 are assigned to class C. All other 8-bit input words are assigned to class D.

Figure 1:
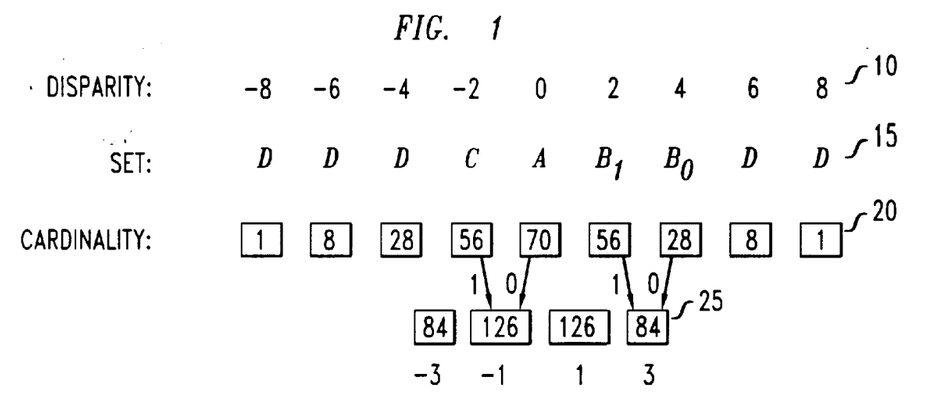
FIG. 1 is a tabular illustration showing an exemplary classification of possible eight-bit input words according to their disparity, and showing a mapping of certain classes of these input words to nine-bit codewords.

Turning to FIG. 1, row 10 of the figure shows the various possible disparities of an 8-bit input word. Row 15 shows the corresponding class assignments. Row 20 shows the number of possible input words of each disparity.

Row 25 of FIG. 1 shows the number of possible 9-bit words having disparities of −3, −1, and 3, respectively. The respective numbers are 84, 126, 126, and 84.

Also shown in FIG. 1 is an initial processing stage, in which input words of classes A, B, and C are mapped to 9-bit image words. Class A words are mapped to words of disparity −1 by appending a 0 bit. Class B words are all mapped to image words of disparity 3. This is achieved by appending a 1 bit if the input word is in Class B1, and by appending a 0 bit if the input word is in Class B0. Class C words are mapped to image words of disparity −1 by appending a 1 bit.

Figure 2:
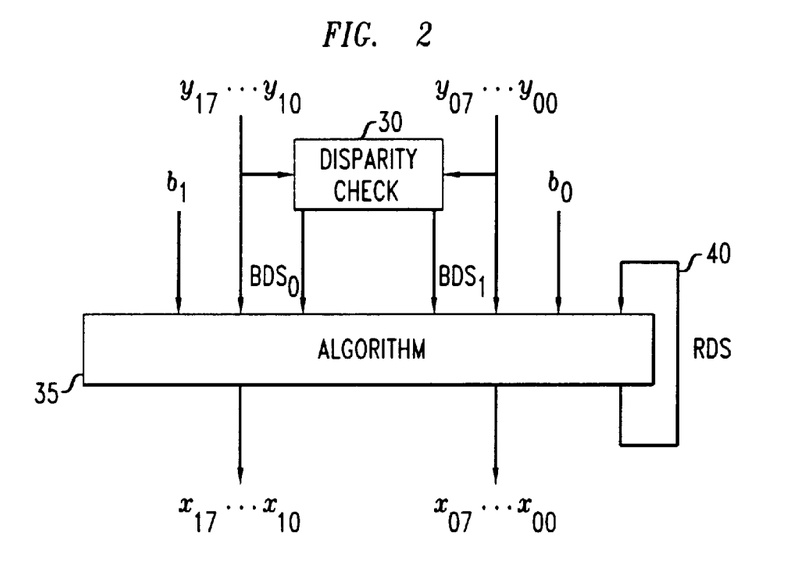
FIG. 2 is a high-level flowchart illustrating an exemplary embodiment of the inventive coding scheme at a conceptual level.

FIG. 2 is a schematic block diagram of an encoder for implementing the encoding scheme described here. The respective 8-bit input words are represented in the figure as

| | $x_{07}$ | $x_{06}$ | $x_{05}$ | $x_{04}$ | $x_{03}$ | $x_{02}$ | $x_{01}$ | $x_{00}$ |
|---|---|---|---|---|---|---|---|---|
| and | | | | | | | | |
| | $x_{17}$ | $x_{16}$ | $x_{15}$ | $x_{14}$ | $x_{13}$ | $x_{12}$ | $x_{11}$ | $x_{10}$. |

The respective 9-bit output words are represented as

| | $y_{07}$ | $y_{06}$ | $y_{05}$ | $y_{04}$ | $y_{03}$ | $y_{02}$ | $y_{01}$ | $y_0$ | $b_0$ |
|---|---|---|---|---|---|---|---|---|---|
| and | | | | | | | | | |
| | $y_{17}$ | $y_{16}$ | $y_{15}$ | $y_{14}$ | $y_{13}$ | $y_{12}$ | $y_{11}$ | $y_{10}$ | $b_1$. |

For convenience of notation, we define the following:

$x_0 = x_{07} \ldots x_{00}$ $x_1 = x_{17} \ldots x_{10}$ $y_0 = y_{07} \ldots y_{00}$ $y_1 = y_{17} \ldots y_{10}$ $w_0 = y_0 b_0$ $w_1 = y_1 b_1$ An alternate name for the disparity is the "block digital sum (BDS)." Mathematically, the definition of the BDS is given by:

$$BDS = \sum_{j=0}^{7} (2x_j - 1).$$

Block 30 of FIG. 2 is a disparity checker that computes the block digital sums $BDS_0$ for input word $x_0$ and $BDS_1$ for input word $x_1$. These values are provided as input to block 35, which represents, e.g., the algorithm to be described below.

Also shown in FIG. 2 is loop 40, labeled "RDS." This loop represents feedback, in the algorithm, of the running digital sum (RDS). The value that is fed back is equal to the previous value, plus the BDS of the current output.

Figure 3A:
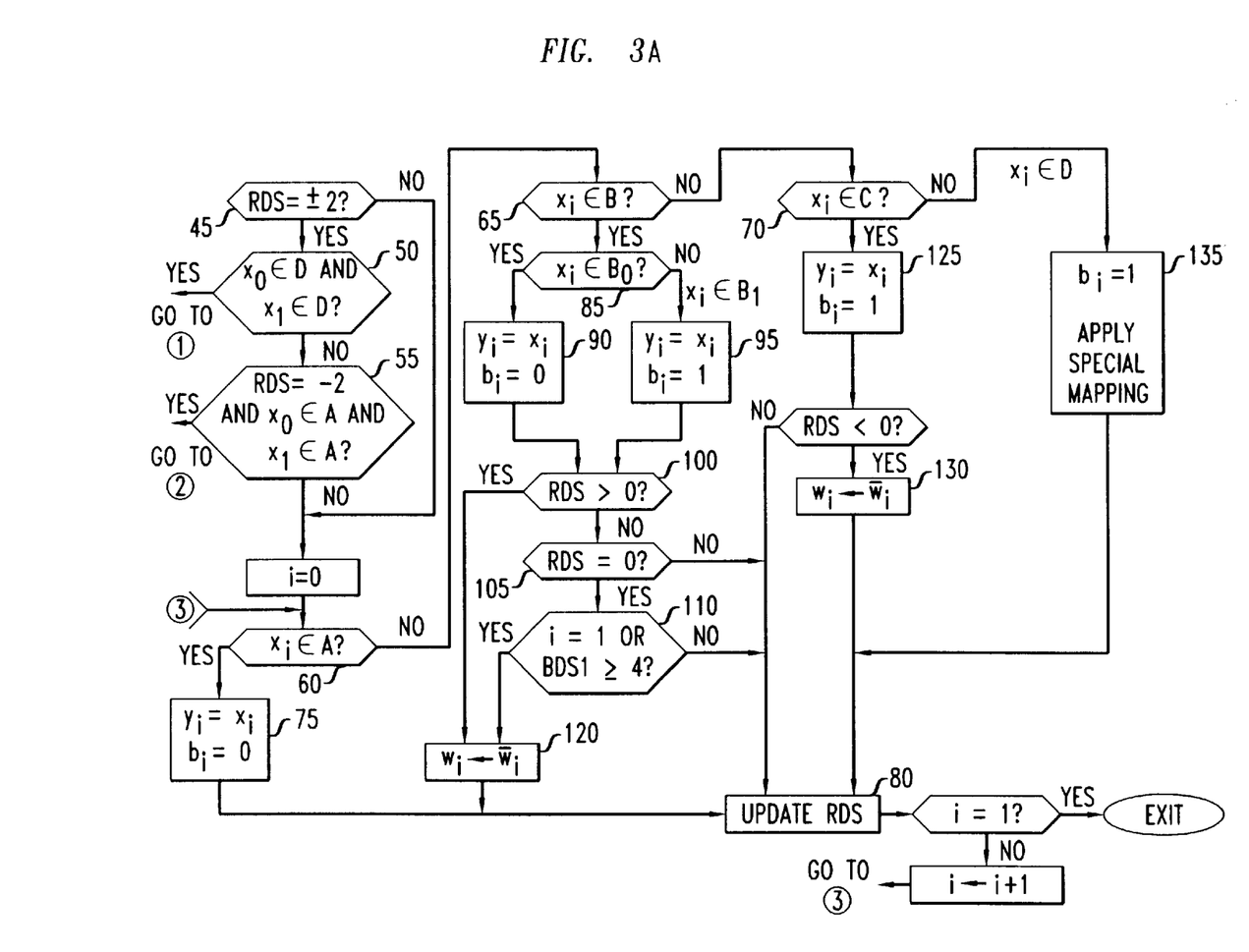
FIGS. 3A and 3B together are a detailed flowchart of an illustrative coding scheme according to the invention in one embodiment.
Figure 3B:
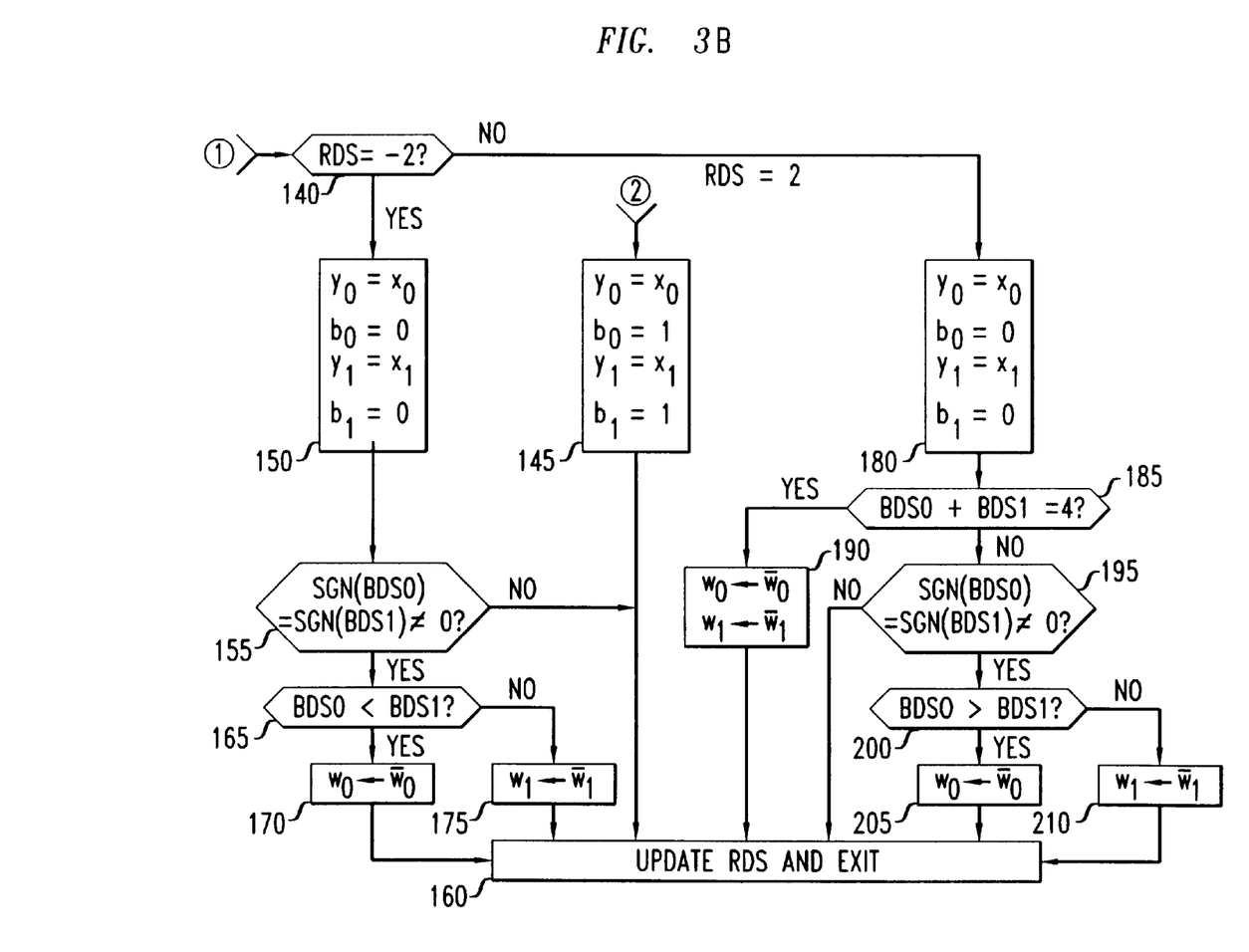

Turning now to FIGS. 3A and 3B, shown there is an expanded view of an exemplary algorithm corresponding to block 35 of FIG. 2. It should be noted that the flowchart of FIGS. 3A and 3B is purely illustrative, and that other algorithms, having equivalent results, are also envisaged as within the scope and spirit of the invention. In particular, certain operations depicted as occurring sequentially can readily be performed in parallel.

We now describe the procedure of FIGS. 3A and 3B. This procedure will map each Class A input word into a codeword of disparity −1 or 1, each Class B input word into a codeword of disparity 3 or −3, and each Class C input word into a codeword of disparity −1 or 1. This procedure will also map each Class D input word into a codeword of disparity 1.

As indicated in blocks 45, 50, and 55, certain special cases are identified and segregated for special treatment. In one such group of cases, the current value of the RDS is ±2, and both $x_0$ and $x_1$ belong to Class D. Such cases are referred to block 140 of FIG. 3B. In another such group of cases, the current value of the RDS is −2, and both $x_0$ and $x_1$ belong to Class A. Such cases are referred to block 145 of FIG. 3B. For all other cases, the operations of blocks 60–135 are performed first for, e.g., $x_0$ and then for $x_1$. The symbol $x_i$ indicates the current one of input words $x_0$ and $x_1$.

As indicated in blocks 60, 65, and 70, there is separate treatment depending on the class of $x_i$. If the class is A, the process goes to block 75, where $y_i$ is set equal to $x_i$, and $b_i$ is set equal to 0. The process then goes to block 80.

If the class is B, the operations of blocks 85–120 are carried out as described below, and the process then goes to block 80.

If the class is C, the process goes to block 125, where $y_i$ is set equal to $x_i$, and $b_i$ is set equal to 1. Then, if the current RDS is non-negative, the process goes to block 80. If the current RDS is negative, then, as shown at block 130, the current $w_i$ (i.e., the current $y_i$ $b_i$) is changed to its binary complement by changing all 1's to 0's and all 0's to 1's. (A word that is replaced by its binary complement is sometimes said to be "inverted.") The process then goes to block 80.

If the class is D, the process goes to block 135, where $b_i$ is set to 1, and a special mapping is applied to $x_i$. This special mapping is described below in reference to FIGS. 4A and 4B. After block 135, the process goes to block 80.

Turning to the case in which the input word belongs to Class B, a determination is first made, as shown at block 85, whether the input word belongs to Class B0 or to Class B1. As shown at blocks 90 and 95, $y_i$ is set equal to $x_i$ in either case, $b_i$ is set equal to 0 for Class B0, and $b_i$ is set equal to 1 for Class B1. Then, as shown at blocks 100 and 105, a determination is made whether the current value of the RDS is positive, zero, or negative.

If the current RDS is postive, the current $w_i$ is changed to its binary complement, as indicated at block 120, and the procedure goes to block 80. If the current RDS is negative, the procedure goes to block 80 without changing the current $w_i$. If the current RDS is zero, a further determination is made as indicated at block 110. If the current input word is $x_1$, the current $w_i$, namely $w_1$, is changed according to block 120, and the procedure then goes to block 80. If the current input word is $x_0$, then the current $w_i$, namely $w_0$, is changed according to block 120 only if the BDS of $x_1$ is at least 4. Otherwise, the procedure goes to block 80 without going to block 120.

At block 80, the RDS is updated according to the current output word.

The treatment of special cases is now discussed with reference to FIG. 3B.

As noted, a pair of input words $x_0$, $x_1$ is referred to block 140 if the current value of the RDS is ±2, and both $x_0$ and $x_1$ belong to Class D.

At block 140, a determination is made whether the current RDS is equal to −2. If the current RDS is equal to −2, then, as indicated at block 150, $y_0$ is set to $x_0$, $b_0$ is set to 0, $y_1$ is set to $x_1$, and $b_1$ is set to 0. Then, as indicated at block 155, a determination is made whether the BDS of $x_0$ and the BDS of $x_1$ are both positive or both negative. If at least one BDS value is zero, or if the BDS values have opposite signs, the procedure goes to block 160, where the RDS value is updated according to the current $w_0$ and $w_1$. If the respective BDS values are both positive or both negative, a further determination is made, as indicated at block 165, whether the BDS of $x_0$ is less than the BDS of $x_1$. If the BDS of $x_0$ is less than the BDS of $x_1$, then, as indicated at block 170, the current $w_0$ is replaced by its binary complement. If the BDS of $x_0$ is not less than the BDS of $x_1$, then, as indicated at block 175, the current $w_1$ is replaced by its binary complement. The procedure then goes to block 160.

If a pair of input words $x_0$, $x_1$ is referred to block 140 and the current RDS value is 2, then the procedure continues at block 180. At block 180, $y_0$ is set to $x_0$, $b_0$ is set to 0, $y_1$ is set to $x_1$, and $b_1$ is set to 0. Then, as indicated at block 185, a determination is made whether the BDS of $x_0$ and the BDS of $x_1$ sum to 4. If these BDS values sum to 4, then, as indicated at block 190, both $w_0$ and $w_1$ are set to their respective binary complements, and the procedure goes to block 160. If these BDS values do not sum to 4, then, as indicated at block 195, a further determination is made whether the BDS of $x_0$ and the BDS of $x_1$ are both positive or both negative. If at least one BDS value is zero, or if the BDS values have opposite signs, the procedure goes to block 160. If the respective BDS values are both positive or both negative, a further determination is made, as indicated at block 200, whether the BDS of $x_0$ is greater than the BDS of $x_1$. If the BDS of $x_0$ is greater than the BDS of $x_1$, then, as indicated at block 205, the current $w_0$ is replaced by its binary complement. If the BDS of $x_0$ is not greater than the BDS of $x_1$, then, as indicated at block 210, the current $w_1$ is replaced by its binary complement. The procedure then goes to block 160.

As noted, a pair of input words $x_0$, $x_1$ is referred to block 145 if the current value of the RDS is −2, and both $x_0$ and $x_1$ belong to Class A. At block 145, $y_0$ is set to $x_0$, $b_0$ is set to 1, $y_1$ is set to $x_1$, and $b_1$ is set to 1. The procedure then goes to block 160.

As noted, a special mapping is invoked at block 135 of FIG. 3A if the current input word belongs to Class D and is not referred to block 140 of FIG. 3B. The object of the special mapping is to map 46 bytes with disparity ±8, ±6, or 4 into 46 bytes with disparity 0. Since there are 70 bytes with disparity 0, the remaining 24 can be used for special signals. Those skilled in the art will appreciate that many schemes are possible for achieving such a mapping. For purposes of illustration, I will now describe one exemplary such mapping, with reference to FIGS. 4A and 4B. It should be understood that other such mappings are also envisaged to lie within the spirit and scope of the invention.

Figure 4A:
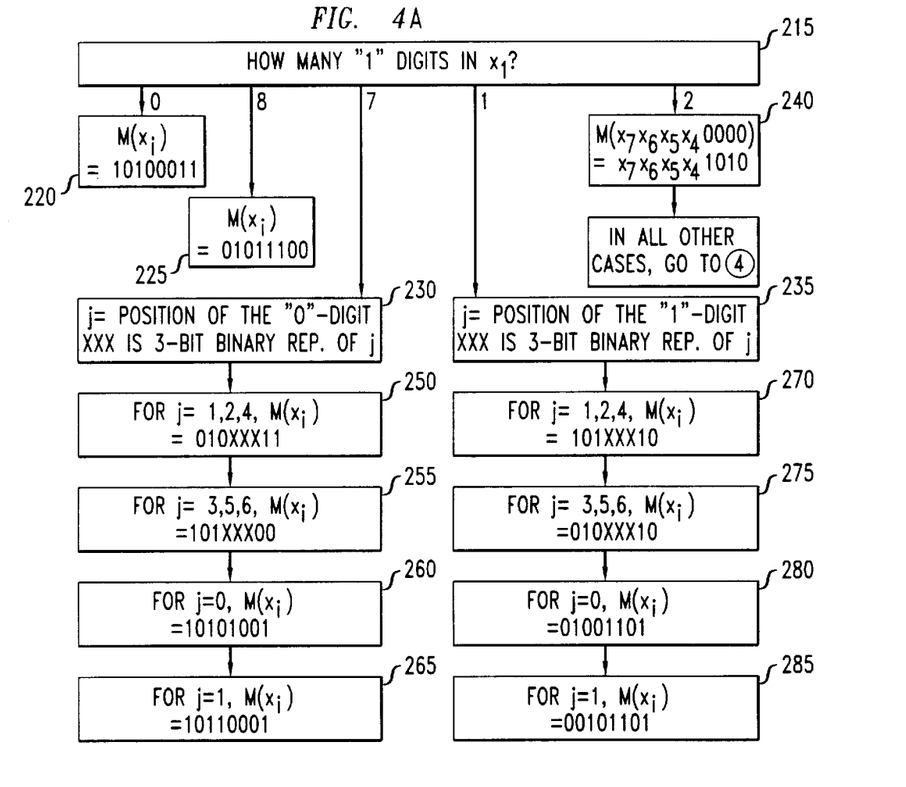
FIGS. 4A and 4B together are a detailed flowchart illustrating the "Special Mapping" step of FIG. 3A.

As indicated at block 215, the number of "1" digits in the input word is counted. If there are none, i.e., the input word is all zeroes, the image of the input word under the mapping is 10100011 (block 220). If there are eight, i.e., the input word is all ones, the image is 01011100 (block 225). If there are seven, i.e., there is only one zero, the process continues at block 230. If there is only a single "1" digit, the process continues at block 235.

If there are two "1" digits, and they both occur within the four leftmost positions of the input word, then as indicated at block 240, the image is obtained from the input word by changing the digits in the four rightmost positions from 0000 to 1010. In all other cases in which the input word has two "1" digits, the procedure continues at block 245.

At block 230, a three-bit binary representation, denoted XXX, is derived for the position j of the "0" digit. The positions j are numbered from 0 for the rightmost digit to 7 for the leftmost digit. If j is 1, 2, or 4, the image is 010XXX11 (block 250). If j is 3, 5, or 6, the image is 101XXX00 (block 255). If j is 0, the image is 10101001 (block 260). If j is 1, the image is 10110001 (block 265).

At block 235, a three-bit binary representation, denoted XXX, is derived for the position j of the "1" digit. If j is 1, 2, or 4, the image is 101XXX10 (block 270). If j is 3, 5, or 6, the image is 010XXX10 (block 275). If j is 0, the image is 01001101 (block 280). If j is 1, the image is 00101101 (block 285).

Figure 4B:
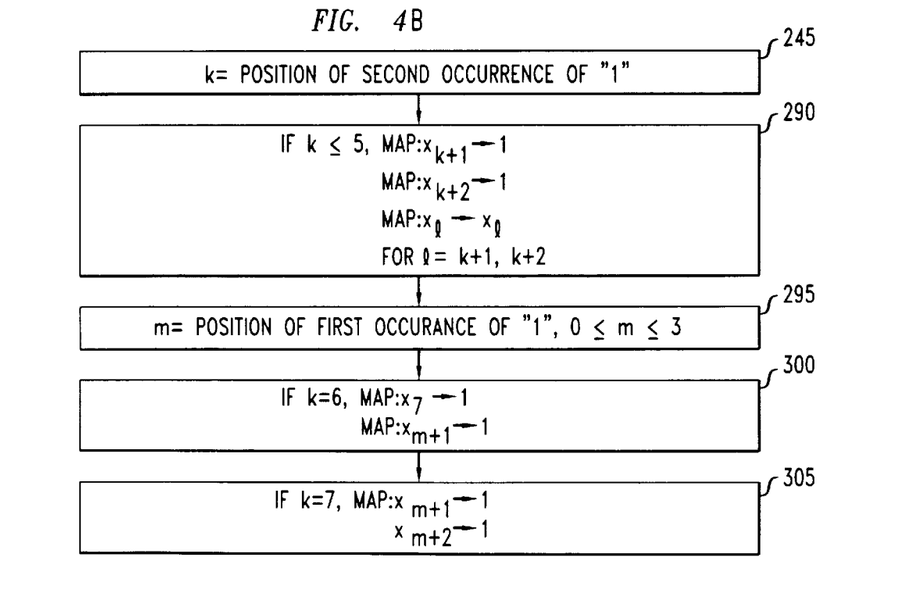

At block 245, the position k of the second of the two "1" digits is obtained. If both "1" digits fall within the first five positions, the image is derived from the input word according to block 290. As shown there, the value "1" is assigned to the digits at positions k+1 and k+2, and the digits at all other positions have the same value as in the input word.

At block 295, the position m of the first of the two "1" digits is also obtained. Since the condition of block 240 does not apply, m cannot be greater than 3. If k is 6, then, as indicated at block 300, the image is obtained from the input word by assigning the value "1" to the digit in the leftmost position, assigning the value "1" to the digit in the m+1 position, and leaving the digits at all other positions undisturbed from their values in the input word. If k is 7, then, as indicated at block 305, the image is obtained from the input word by assigning the value "1" to the digits in the m+1 and m+2 positions, and leaving the digits at all other positions undisturbed from their values in the input word.

One advantage of the inventive encoding procedure is that it has a simple and computationally efficient decoding procedure. The decoding procedure is now described with reference to FIGS. 5A and 5B. It should be noted that the procedure as described by the figures is illustrative only, and that other procedures, producing equivalent results, are also envisaged as falling within the scope and spirit of the invention.

Figure 5A:
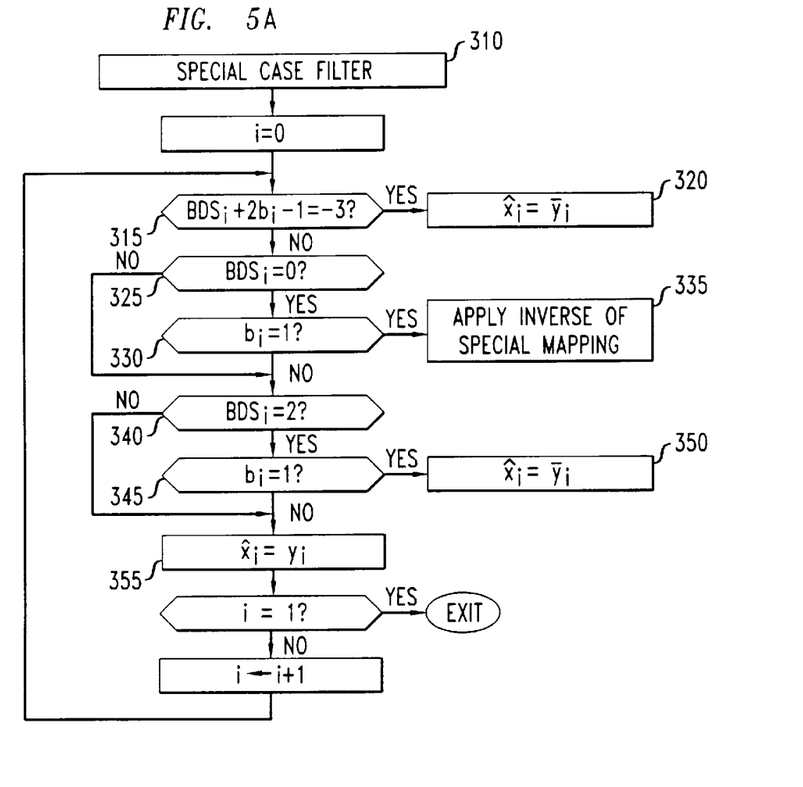
FIG. 5A is a detailed flowchart of an exemplary procedure for decoding words that have been encoded according to FIGS. 3A–4B.

Turning first to FIG. 5A, there is shown a filter 310 for identifying and disposing of special cases. Filter 310 is described below in connection with FIG. 5B.

If an input codeword $y_i$, i=0, 1, is not treated by filter 310, the procedure of blocks 315–355 is invoked. As shown in the figure, this procedure is carried out for $y_0$ without reference to $y_1$, and for $y_1$ without reference to $y_0$. For each input codeword $y_i$, the output recovered word $\hat{x}_i$ is determined solely from $y_i$, including from its BDS, denoted $BDS_i$, and from $b_i$.

At block 315, the expression $BDS_i + 2b_i - 1$ is evaluated. If the value of this expression is equal to −3, then the recovered word is set equal to the binary complement of the input codeword. Otherwise, the procedure goes to block 325.

At blocks 325 and 330, a determination is made whether the current BDS is equal to zero (block 325), and whether the current $b_i$ is equal to 1 (block 330). If both conditions are met, the recovered word is determined according to block 335. At block 335, the inverse of the special mapping of FIGS. 4A and 4B is applied. In typical cases, the inverse mapping will be readily deriveable from the forward mapping, and thus no detailed description is needed here of an inverse mapping.

If the condition of block 325 or the condition of block 330 is not met, the procedure goes to block 340. At blocks 340 and 345, a determination is made whether the current BDS is equal to 2 (block 340), and whether the current $b_i$ is equal to zero (block 345). If both conditions are met, the recovered word is set equal to the binary complement of the input codeword, as indicated at block 350. Otherwise, the recovered word is set equal to the input codeword, as indicated at block 355.

Figure 5B:
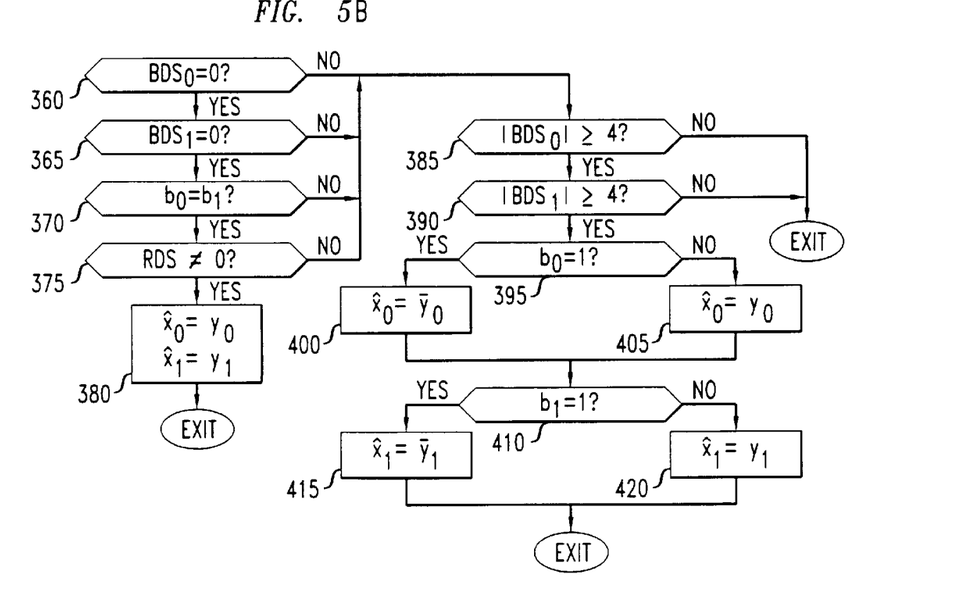
FIG. 5B is an expanded view, in the form of a flowchart, of the "Special Case Filter" block of FIG. 5A.

The special-case filter of block 310 is now described with reference to FIG. 5B. Initially, a determination is made whether $BDS_0$ has the value 0 (block 360), whether $BDS_1$ has the value 0 (block 365), whether b0 and b1 are equal (block 370), and whether the current value of the RDS is non-zero (block 375). If all of these conditions are met, then as indicated at block 380, the recovered word $\hat{x}_0$ is set equal to $y_0$, and the recovered word $\hat{x}_1$ is set equal to $y_1$. Otherwise, the procedure goes to block 385.

At blocks 385 and 390, a determination is made whether the absolute value of $BDS_0$ is at least 4 (block 385), and whether the absolute value of $BDS_1$ is at least 4 (block 390). If both of these conditions are met, the procedure goes to block 395. Otherwise, the procedure exits the special-case filter, and goes to block 315 of FIG. 5A (for each value of i, i=0, 1).

At block 395, a determination is made whether the value of $b_0$ is equal to 1. If the value of $b_0$ is equal to 1, the recovered word $\hat{x}_0$ is set equal to the binary complement of the input codeword $y_0$. Otherwise, the recovered word $\hat{x}_0$ is set equal to the input codeword $y_0$. The procedure then goes to block 410.

At block 410, a determination is made whether the value of $b_1$ is equal to 1. If the value of $b_1$ is equal to 1, the recovered word $\hat{x}_1$ is set equal to the binary complement of the input codeword $y_1$. Otherwise, the recovered word $\hat{x}_1$ is set equal to the input codeword $y_1$.

All of the procedures of FIGS. 2–5B, discussed above, are readily performed by a general purpose digital computer or special-purpose digital processor, acting under the control of an appropriate program implemented in software, hardware, or firmware.

Figure 6:
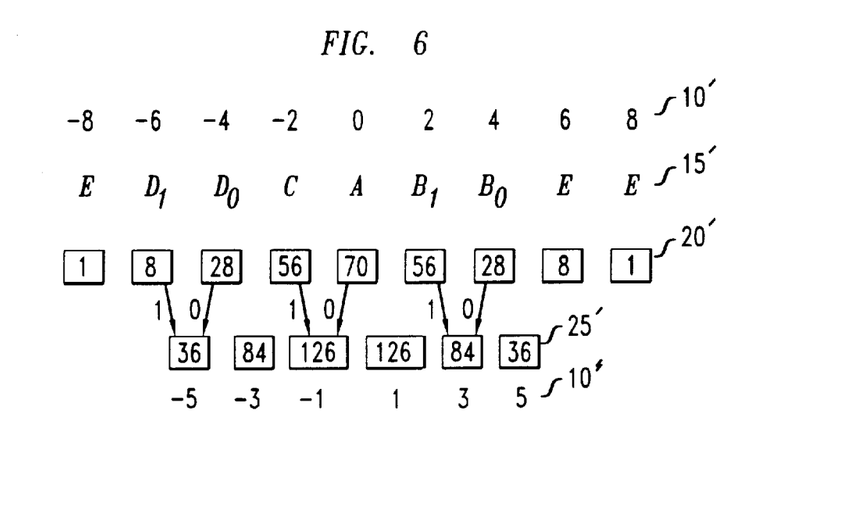
FIG. 6 is a tabular illustration showing an exemplary classification of input words and a mapping of classes of input words, alternate to the classification and mapping of FIG. 1.

An alternate embodiment of the invention is now described with reference to FIGS. 6–9. Depicted in FIG. 6 is a scheme in which an input word of disparity ±8, ±6, ±4, ±2, or 0, as indicated at row 10', is assigned according to its disparity to one of classes A, $B_0$, $B_1$, C, $D_0$, $D_1$, or E, as shown at row 15'. Classes $B_0$ and $B_1$ together make up Class B. Classes $D_0$ and $D_1$ together make up Class D. The number of possible words in each class is indicated at row 20'. A mapping of Class A, B, C, and D input words into 9-bit image words by appending a 0 or 1 bit is indicated by arrows in the figure. Indicated in row 25' are the numbers of possible 9-bit words in each of the resulting classes, and indicated in row 10" are the disparities of those classes.

An exemplary mapping procedure in accordance with FIG. 6 is now described with reference to FIG. 7 and FIGS. 8A–8D. This procedure will map each Class A input word into a codeword of disparity −1 or 1, each Class B input word into a codeword of disparity 3 or −3, and each Class C input word into a codeword of disparity −1 or 1. This procedure will also map each Class D input word (i.e., a codeword of disparity −6 or −4) into a codeword of disparity −5 or +5. This procedure will also map each Class E input word into an intermediate image word obtained by appending a 0 bit to the input word, thus obtaining a word of disparity one less than that of the input word. In some cases, the output codeword will be the same as this intermediate image word. In other cases, however, the output codeword will be obtained by inverting the intermediate image word. As explained below, such inversion is performed, e.g., if the disparity of the 8-bit input word has the same sign as the current value of the RDS.

Figure 7:
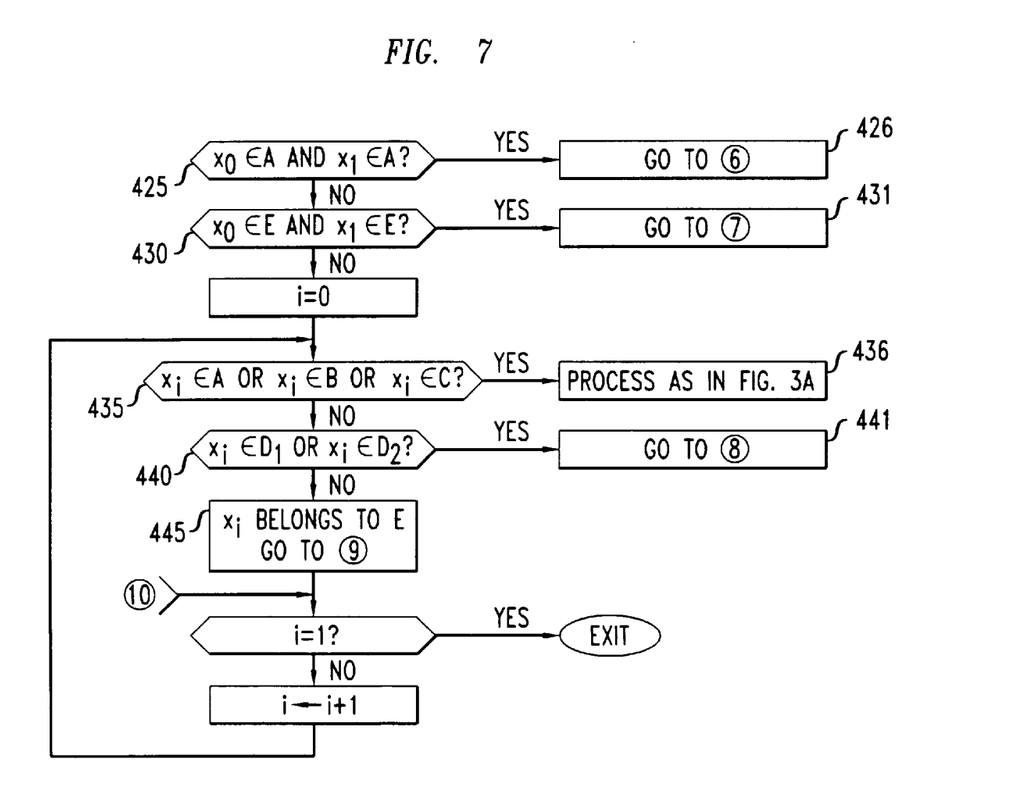
FIG. 7 is a portion of a flowchart illustrating the inventive coding scheme, according to the exemplary embodiment of FIG. 6. The portion shown in FIG. 7 is effective for classifying input words, and in some cases input word pairs, and directing the input words or word pairs for further processing.

As indicated at blocks 425 and 426 of FIG. 7, there is a special mapping procedure if both both $x_0$ and $x_1$ belong to Class A. As indicated at blocks 430 and 431, there is a special mapping procedure if both both $x_0$ and $x_1$ belong to Class E. If neither special procedure applies, the steps indicated at blocks 435–445 are carried out, in turn, for input word $x_0$ and for input word $x_1$. As indicated at blocks 435 and 436, an input work in any of classes A, B, and C is mapped in accordance with the procedure previously described with reference to FIG. 3A. As indicated at blocks 440 and 441, an input word in Class D is mapped in accordance with a procedure to be described below with reference to FIG. 8C. As indicated at block 445, an input word not already treated must belong to Class E. Such an input word is mapped in accordance with a procedure to be described below with reference to FIG. 8D.

Figure 8A:
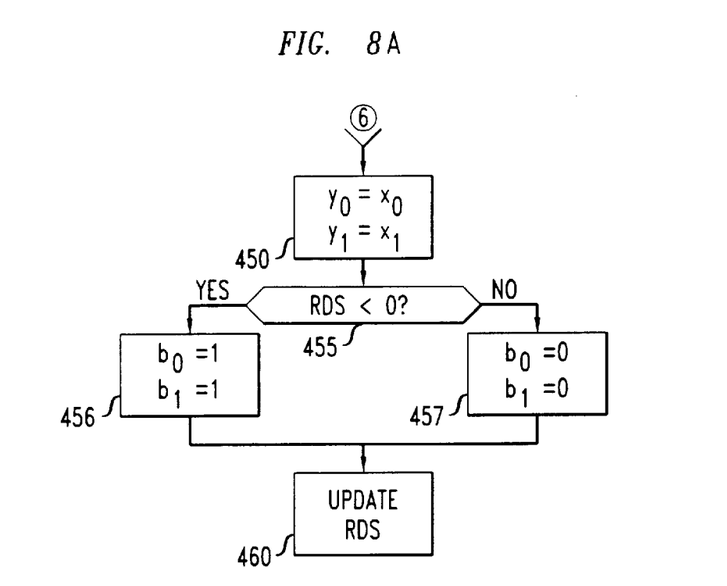
FIGS. 8A–8D are further portions of the flowchart of FIG. 7. Each of FIGS. 8A–8D describes a process for treating input words occupying certain classes or corresponding to certain special cases.

FIG. 8A describes the special mapping procedure if both $x_0$ and $x_1$ belong to Class A. As indicated at block 450 of that figure, $y_0$ is set to $x_0$, and $y_1$ is set to $x_1$. As indicated at blocks 455–457, $b_0$ and $b_1$ are set to 1 if the current RDS is negative, but otherwise they are set to 0. As indicated at block 460, the RDS is then updated.

Figure 8B:
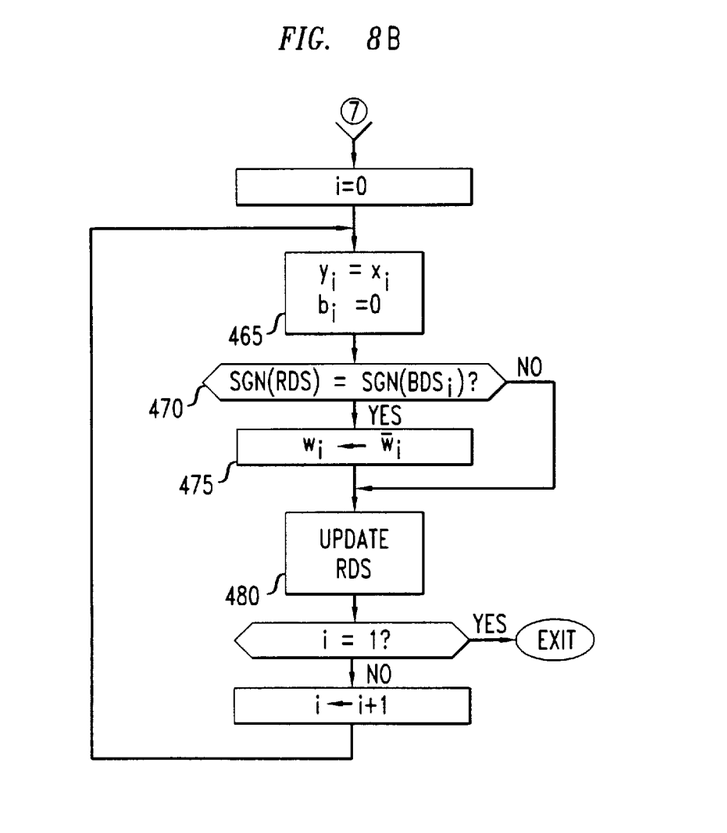

FIG. 8B describes the special mapping procedure if both $x_0$ and $x_1$ belong to Class E. The procedure of FIG. 8B is carried out, in turn, for input word $x_0$ and for input word $x_1$. As indicated at block 465, the current output word $y_i$ is set equal to the current input word $x_i$, and the current $b_i$ is set to 0. As indicated at block 470, a test is then performed whether the current RDS and the BDS of the current input word are either both positive or both negative. If one of these is true, then, as indicated at block 475, the current $w_i$ is replaced by its binary complement. Otherwise, block 475 is skipped. The process then goes to block 480, where the RDS is updated.

Figure 8C:
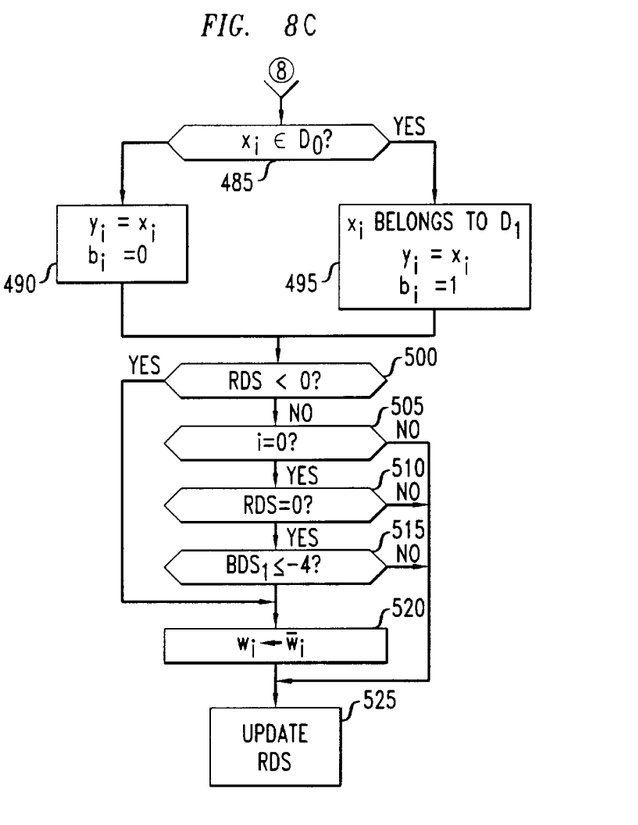

FIG. 8C describes the mapping procedure to be carried out if the current input work belongs to Class D. As indicated at blocks 485–495, the current output word is set equal to the current input word. If the input word belongs to Class $D_0$, the current $b_i$ is set to 0. If the input word belongs to Class $D_1$, the current $b_i$ is set to 1. As indicated at blocks 500 and 520, the current $w_i$ is replaced by its binary complement if the current value of the RDS is negative. As indicated at blocks 505–520, if the current value of the RDS is 0, $w_0$ is replaced by its binary complement if it is also true that $x_1$ has a BDS of −4 or less. The process then goes to block 525, where the RDS is updated.

Figure 8D:
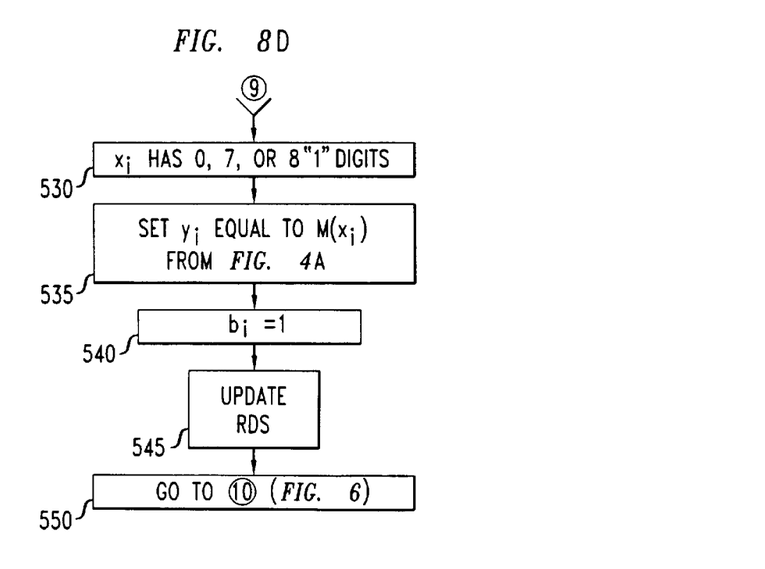

FIG. 8D describes the mapping procedure to be carried out if the current input work belongs to Class E. As indicated at block 530, this class will contain only input words having 0, 7, or 8 digits having the binary value "1". As indicated at block 535, the mapping is carried out in accordance with the procedure described above with reference to FIG. 4A. As indicated at block 540, the current $b_i$ is set to 1. As indicated at block 545, the RDS is then updated. As indicated at block 550, control then returns to the procedure of FIG. 6.

Figure 9:
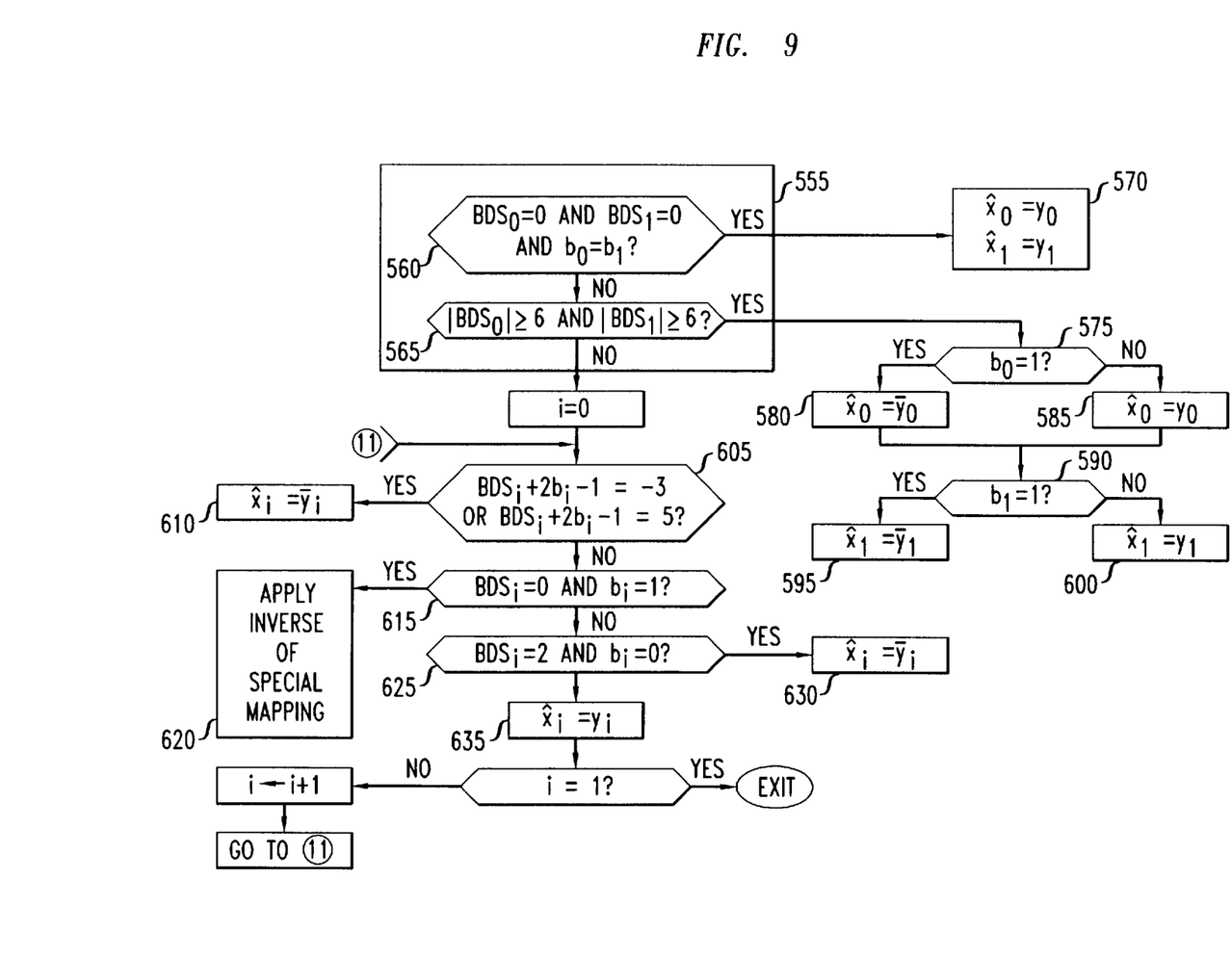
FIG. 9 is a flowchart of an exemplary procedure for decoding words that have been encoded according to the procedure of FIGS. 7 and 8A–8D.

Decoding is carried out, e.g., in accordance with the procedure of FIG. 9. Block 555 is a filter for identifying certain special cases. As shown at block 560, within block 555, one of these special cases requires that the input codewords $y_0$ and $y_1$ both have disparity 0, and that their respective appended bits $b_0$ and $b_1$ be equal. In that case, as shown at block 570, $\hat{x}_0$ is set equal to the input codeword $y_0$, and $\hat{x}_1$ is set equal to the input codeword $y_1$. As shown at block 565, also within the filter block 555, a second special case requires that the input codewords $y_0$ and $y_1$ both have disparities of absolute value 6 or more. In that case, as shown at blocks 575, 580, and 585, $\hat{x}_0$ is set equal to $y_0$ if $b_0$ equals 0, and $\hat{x}_0$ is set equal to the binary complement of $y_0$ if $b_0$ equals 1. Moreover, as shown at blocks 590, 595, and 600, $\hat{x}_1$ is set equal to $y_1$ if $b_1$ equals 0, and $\hat{x}_1$ is set equal to the binary complement of $y_1$ if $b_1$ equals 1.

If the special cases of filter block 555 do not apply, the decoding of first input codeword $y_0$ does not depend on second input codeword $y_1$, and the decoding of $y_1$ does not depend on $y_0$. Accordingly, the procedures of blocks 605–635 are applied, in turn, to input codewords $y_0$ and $y_1$, i.e., to input codeword $y_i$, i=0,1.

At block 605, a test is performed whether the disparity of the input codeword, plus twice the corresponding appended bit $b_i$, minus 1, equals –3 or +5. If this condition is satisfied, $\hat{x}_i$ is set equal to the binary complement of $y_i$, as indicated at block 610. Otherwise the procedure goes to block 615. At block 615, a test is performed whether the input codeword has disparity 0 and whether the corresponding appended bit $b_i$ is 1. If both these conditions are satisfied, the input codeword is decoded by inverting the special mapping of FIG. 4A, as indicated at block 620. Otherwise, the procedure goes to block 625. At block 625, a test is performed whether the input codeword has disparity 2 and whether the corresponding appended bit $b_i$ is 0. If both these conditions are satisfied, $\hat{x}_i$ is set equal to the binary complement of $y_i$, as indicated at block 630.

In all other cases, $\hat{x}_i$ is set equal to $y_i$, as indicated at block 635.

The invention claimed is:

1. A coding method, comprising:
    (a) accepting a plurality of 16-bit words of data;
    (b) splitting each 16-bit word of said plurality into a first and a second 8-bit input word;
    (c) computing a disparity of each 8-bit input word;
    (d) mapping said 8-bit input words to respective first and second 9-bit codewords; and
    (e) maintaining a running digital sum (RDS) of bits of the 9-bit codewords;
  wherein:
    (I) the mapping of each 8-bit input word is responsive to the disparity of said 8-bit input word;
    (II) the mapping of each of at least some 8-bit input words is responsive to the RDS; and
    (III) the mapping of each of at least some first or second 8-bit input words is responsive to the disparity of the corresponding second or first 8-bit input word.

2. The method of claim 1, wherein the mapping of each of at least some 8-bit input words to a codeword comprises mapping said 8-bit input word to an intermediate image word, and conditionally performing a binary inversion of the intermediate image word.

3. The method of claim 2, wherein the conditional inversion is subject to a condition related to the value of the RDS.

4. The method of claim 3, wherein the conditional inversion is carried out only when the RDS is non-negative.

5. The method of claim 2, wherein the conditional inversion is carried out on the intermediate image of a first 8-bit input word subject to a condition related to the disparity of the corresponding second 8-bit input word.

6. The method of claim 1, wherein the mapping of each 8-bit input word of disparity –2, 0, 2, or 4 is equivalent to mapping each said word to itself or to its binary complement and appending a 0 or 1 bit.

7. The method of claim 1, wherein:
    each 8-bit input word of disparity 0, to be referred to as a Class A word, is mapped to a codeword of disparity –1 or 1;
    each 8-bit input word of disparity 2 or 4, to be referred to as a Class B word, is mapped to a codeword of disparity 3 or –3; and
    each 8-bit input word of disparity –2, to be referred to as a Class C word, is mapped to a codeword of disparity –1 or 1.

8. The method of claim 7, wherein a first or second 8-bit input word of Class A is mapped to a codeword of disparity 1 only if the corresponding second or first 8-bit input word is also of Class A and the RDS is negative.

9. The method of claim 7, wherein a first or second 8-bit input word of Class A is mapped to a codeword of disparity 1 only if the corresponding second or first 8-bit input word is also of Class A and the RDS equals –2.

10. The method of claim 7, wherein a Class B word is mapped to a codeword of disparity –3 only if the RDS is non-negative.

11. The method of claim 10, wherein, if the RDS is 0, a class B word is mapped to a codeword of disparity –3 only if said Class B word is a second 8-bit input word, or if it is a first 8-bit input word and the corresponding second 8-bit input word has a disparity of at least 4.

12. The method of claim 7, wherein a Class C word is mapped to a codeword of disparity 1 only if the RDS is negative.

13. The method of claim 7, wherein each 8-bit input word of disparity –8, –6, –4, 6, or 8 is mapped to a codeword of disparity 1.

14. The method of claim 7, wherein each 8-bit input word of disparity –6 or –4 is mapped to a codeword of disparity –5 or 5.

15. The method of claim 14, wherein each 8-bit codeword of disparity –8, 6, or 8 is mapped to an intermediate image word by appending a 0 bit, and the output codeword is obtained by inverting the intermediate image word if the disparity of the 8-bit image word has the same sign as the current value of the RDS.

\* \* \* \* \*